United States Patent
Koike

(10) Patent No.: US 6,190,424 B1
(45) Date of Patent: *Feb. 20, 2001

(54) PROCESS FOR FABRICATING TWO DIFFERENT TYPES OF WAFERS IN A SEMICONDUCTOR WAFER PRODUCTION LINE

(75) Inventor: Atsuyoshi Koike, Kokubunji (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/371,139

(22) Filed: Jan. 11, 1995

(30) Foreign Application Priority Data

Jan. 14, 1994 (JP) .................................. 6-002575

(51) Int. Cl.[7] ................................................ G06F 15/46
(52) U.S. Cl. .......................................................... 29/25.01
(58) Field of Search .............................. 29/25.01, 33 P, 29/711, 742, 783, 791

(56) References Cited

U.S. PATENT DOCUMENTS

| | | | |
|---|---|---|---|
| 4,954,453 | * | 9/1990 | Venutolo . |
| 5,024,570 | * | 6/1991 | Kriseko et al. .................. 414/222 |
| 5,076,205 | * | 12/1991 | Vowles et al. .................. 118/719 |
| 5,089,862 | * | 2/1992 | Warner, Jr. et al. . |
| 5,198,387 | * | 3/1993 | Tang .................................. 437/101 |
| 5,264,712 | * | 11/1993 | Murata et al. ...................... 257/71 |
| 5,358,901 | * | 10/1994 | Fiordalice et al. . |
| 5,364,818 | * | 11/1994 | Ouellet ............................. 437/195 |
| 5,372,471 | * | 12/1994 | Wu . |
| 5,399,531 | * | 3/1995 | Wu . |
| 5,404,046 | * | 4/1995 | Matsumoto et al. ............ 257/750 |
| 5,450,326 | * | 9/1995 | Black . |
| 5,495,417 | * | 2/1996 | Fuduka et al. ................... 364/468 |
| 5,512,320 | * | 4/1996 | Turner et al. . |
| 5,605,866 | * | 2/1997 | McClanahan et al. . |
| 5,674,786 | * | 10/1997 | Turner et al. . |
| 5,697,749 | * | 12/1997 | Iwabuchi et al. . |

FOREIGN PATENT DOCUMENTS

439084 * 7/1991 (EP) ...................................... 29/742

OTHER PUBLICATIONS

Burggraaf, Peter, Cluster Tools for 1990s Chips, Semiconductor International, pp. 55–63, Aug. 1990.*

Bader, Martin E., Integrated Processing Equipment, Semiconductor International, pp. 149–154, Aug. 1990.*

* cited by examiner

Primary Examiner—David E. Graybill
(74) Attorney, Agent, or Firm—Beall Law Offices

(57) ABSTRACT

A semiconductor integrated circuit device fabrication method has a main processing line and a sub-processing line. The main processing line includes a plurality of main batch processing sections, each of which processes a plurality of main objects at a time, and a plurality of main sequential processing sections, each of which processes a minimum number of main objects at a time. The main processing line feeds the main objects to the main batch processing sections and the main sequential processing sections for predetermined processing. The sub-processing line includes a plurality of sub-processing sections, each of which performs processing identical with that of a corresponding main batch processing section on a minimum number of sub-objects and certain of the main sequential processing sections. The sub-processing line feeds the sub-objects to the sub-processing sections and the main sequential processing sections for predetermined processing.

4 Claims, 4 Drawing Sheets

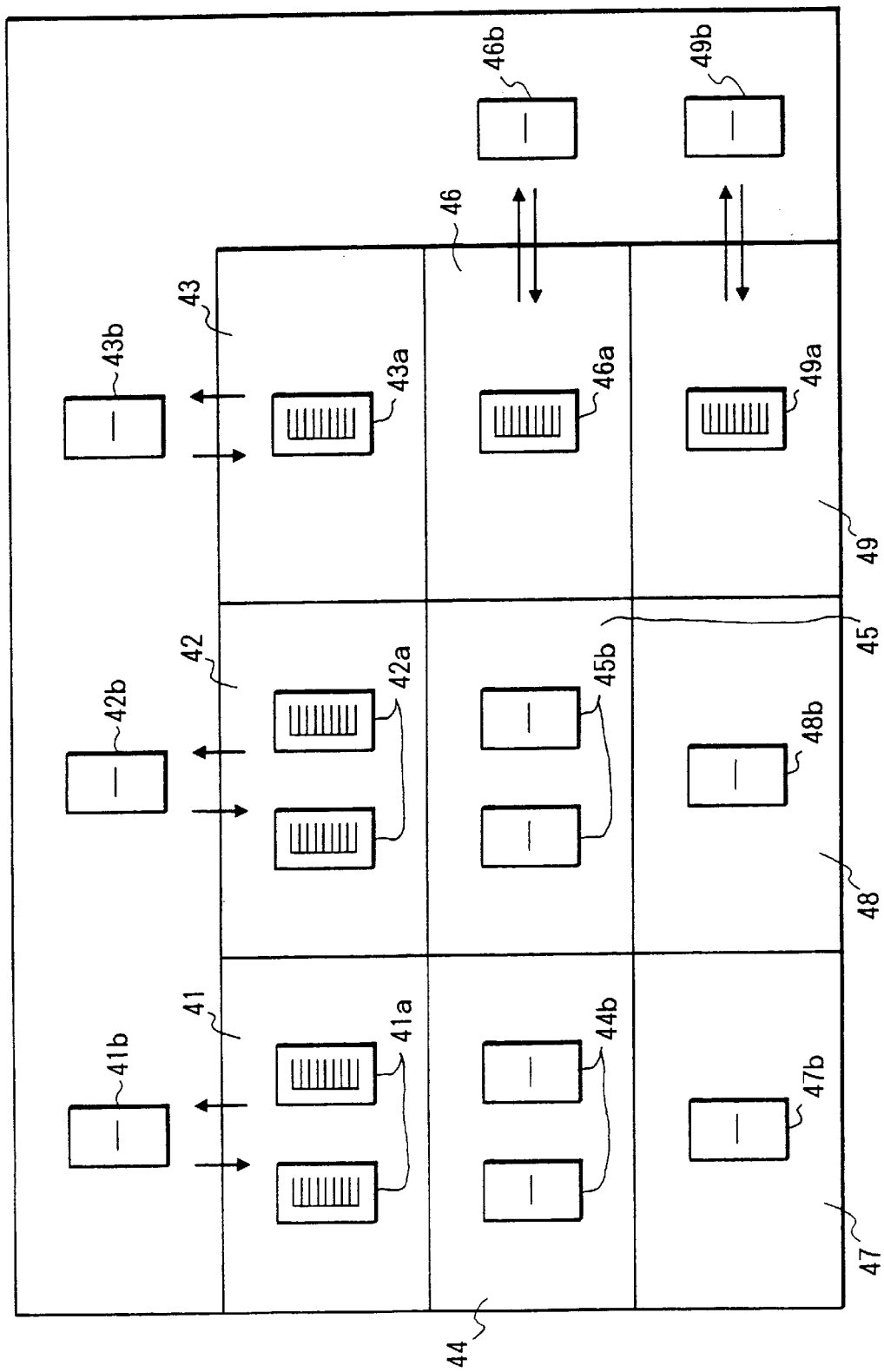

PROCESS FOR FABRICATING TWO DIFFERENT TYPES OF WAFERS IN A SEMICONDUCTOR WAFER PRODUCTION LINE

BACKGROUND OF THE INVENTION

The present invention relates to a technique for processing an object to be treated in a plurality of processes and more particularly to a technique for processing semiconductor wafers.

Semiconductor integrated circuit devices, such as logic ICs, memory ICs and one-chip microcomputers, are fabricated by forming semiconductor circuit elements into a silicon wafer through diffusion, wiring and other processes and dividing the wafer into single semiconductor integrated circuit devices (individual semiconductor chips).

The wafer manufacturing process to build semiconductor circuit elements into a semiconductor wafer basically comprises: a cleaning process to clean the surface of the wafer; an oxidation process to form a uniform oxidized film over the wafer surface; a diffusion process to diffuse impurity atoms into the silicon substrate; and a photo-etching process that, after transferring a desired device pattern onto the photoresist, performs an etch on the photoresist to form a target pattern. These processes are repetitively performed on the semiconductor wafer a number of times.

To manufacture a semiconductor integrated circuit device based on a circuit pattern whose design was completed in the previous step, apparatuses that perform the above-mentioned processes, such as a cleaning equipment, an oxidation equipment, a low-pressure CVD equipment, and a photo-etching equipment, are constructed in the same way as in the actual production line. Then, a sample or experimental product of the semiconductor wafer is made by using the production line thus set up and is subjected to tests such as a circuit operation test to check the sample wafer, followed by the mass production of the semiconductor wafer. If the tests have found that the prepared production line cannot produce a desired product, the conditions of each process are adjusted and another sample is manufactured.

In building the production line, it is preferred to set the layout of each process so that the processing time of each process for one wafer is almost equal. In the low-pressure CVD equipment used in the production line, for example, 100 wafers are processed in a batch, which takes about four hours. Hence, the processing time for one wafer is about 2 and a half minutes.

In the photolithography apparatus that transfers a device pattern onto the photoresist, about 25 wafers are set in the apparatus and processed one at a time. The processing time for each wafer is about 2–3 minutes.

To fabricate a sample wafer, the steps involve, as mentioned above, first setting up a production line, operating the production line under the same condition as when manufacturing the actual production type wafer, and then inspecting the sample. Thus, the inspection can be made of the sample wafer if one semiconductor wafer is obtained. To reproduce the same conditions as those when processing the production type wafers, however, the same number of sample wafers as the number of production type wafers that would be processed in the actual production line are processed taking the time normally spent to process 100 wafers.

SUMMARY OF THE INVENTION

For this reason, it takes long for the processing to be completed even when it is desired to have a small number of wafers and inspect them quickly, as when manufacturing the sample wafers.

On the other hand, even in processes such as the oxidation process and low-pressure CVD process that allow a batch processing, the wafers can be processed one at a time. For example, when the low-pressure CVD processing is performed on a one-by-one basis, the processing can be finished in about 15 minutes, which means a longer processing time per wafer than that taken by the batch processing.

This inventor examined the processing line for the semiconductor wafers. The outline of the technique examined by this inventor is described below.

That is, if the processing that is performed on a batch basis for the production type wafers is changed to a one-by-one-mode processing, it is found that although the processing time per wafer in each process becomes longer, the total processing time required to finish the complete wafer processing can be shortened. Therefore, besides the production line, a sample making line may be built to allow the equipment that performs a one-by-one-mode processing for the production type wafers to be shared by both of the lines, thereby realizing a substantial reduction in the processing time for the sample wafers.

Further, while the production line is in operation, the one-by-one-mode processing that makes up the production line may be used to make a sample wafer of a different type than the production type. Moreover, the sample making line arranged by the side of the production line may be used also as a production line for fabricating ASIC wafers such as gate arrays and standard cells, thereby making it possible to put different types of wafers on the production lines and fabricate them at the same time.

An object of this invention is to provide a processing system and a processing method, in which a sample making line built by the side of the production line for mass-producing products shares with the production line a variety of processing sections that make up the production line.

Another object of this invention is to provide a processing system and a processing method, which include a first line for processing one kind of objects and a second line for another kind of objects that shares with the first line the processing sections making up the first line, so as to process fixed flows of different kinds of objects fed on the production lines.

Representative aspects of this invention may be briefly summarized as follows.

The processing system has a main processing line for processing main objects and a sub-processing line for processing sub-objects. The main processing line comprises: a plurality of main batch processing sections, each of which processes a plurality of main objects; and a plurality of main sequential processing sections, each of which processes a minimum number of main objects. The main objects are supplied to the main batch processing sections and the main sequential processing sections in a predetermined order where they are subjected to predetermined processing. The sub-processing line comprises: a plurality of sub-processing sections, each of which performs processing identical with that of the corresponding main batch processing section on a minimum number of sub-objects; and the main sequential processing sections. The sub-objects are supplied to the sub-processing sections and the main sequential processing sections in a predetermined order where they are subjected to predetermined processing.

In another aspect, the main processing line comprises: a plurality of main objects-dedicated processing sections, each of which processes a plurality of main objects at a time; and a common sequential processing section which divides the main objects into minimum-number groups and processes one group of the main objects at a time and at the same time processes a minimum number of sub-objects; wherein the main objects are transported along the main line in a predetermined order. The sub-processing line comprises: a plurality of sub-objects-dedicated processing sections, each of which performs processing identical with that of the corresponding main objects-dedicated processing section on a minimum number of sub-objects; and the common sequential processing section; wherein the sub-objects are supplied to the sub-objects-dedicated processing sections and the common sequential processing section in a predetermined order.

The sub-processing line—which comprises a plurality of main sequential processing sections making up the main processing line and a plurality of sequential sub-processing sections—is totally of the sequential processing type. This sub-processing line processes an object as a sample of the product which will later be mass-produced on the main processing line. Based on the result of the sample product experimentally manufactured on the sub-processing line, the optimum processing conditions for mass-production are fed back to each of the processing sections of the main processing line. Further, because the sample product is processed by the totally sequential sub-processing line, the overall time required to complete the experimental product can be reduced significantly.

Further, while the production-type objects are being processed by the main processing line—which comprises the main objects-dedicated processing sections and the common sequential processing section—it is possible to process an experimental product of another kind than the product being processed on the main processing line or a different kind of product on the sub-processing line—which comprises the common sequential processing section of the main processing line and the sub-objects-dedicated processing sections. Therefore, mixed flows of different kinds of objects can be handled by a single processing system, substantially improving the processing efficiency.

BRIEF DESCRIPTION OF THE DRAWINGS

FIG. 4 is a plan view showing the layout of the second embodiment of the processing device.

DETAILED DESCRIPTION OF THE INVENTION

Now, embodiments of this invention will be described in detail by referring to the accompanying drawings.

Figure 1:
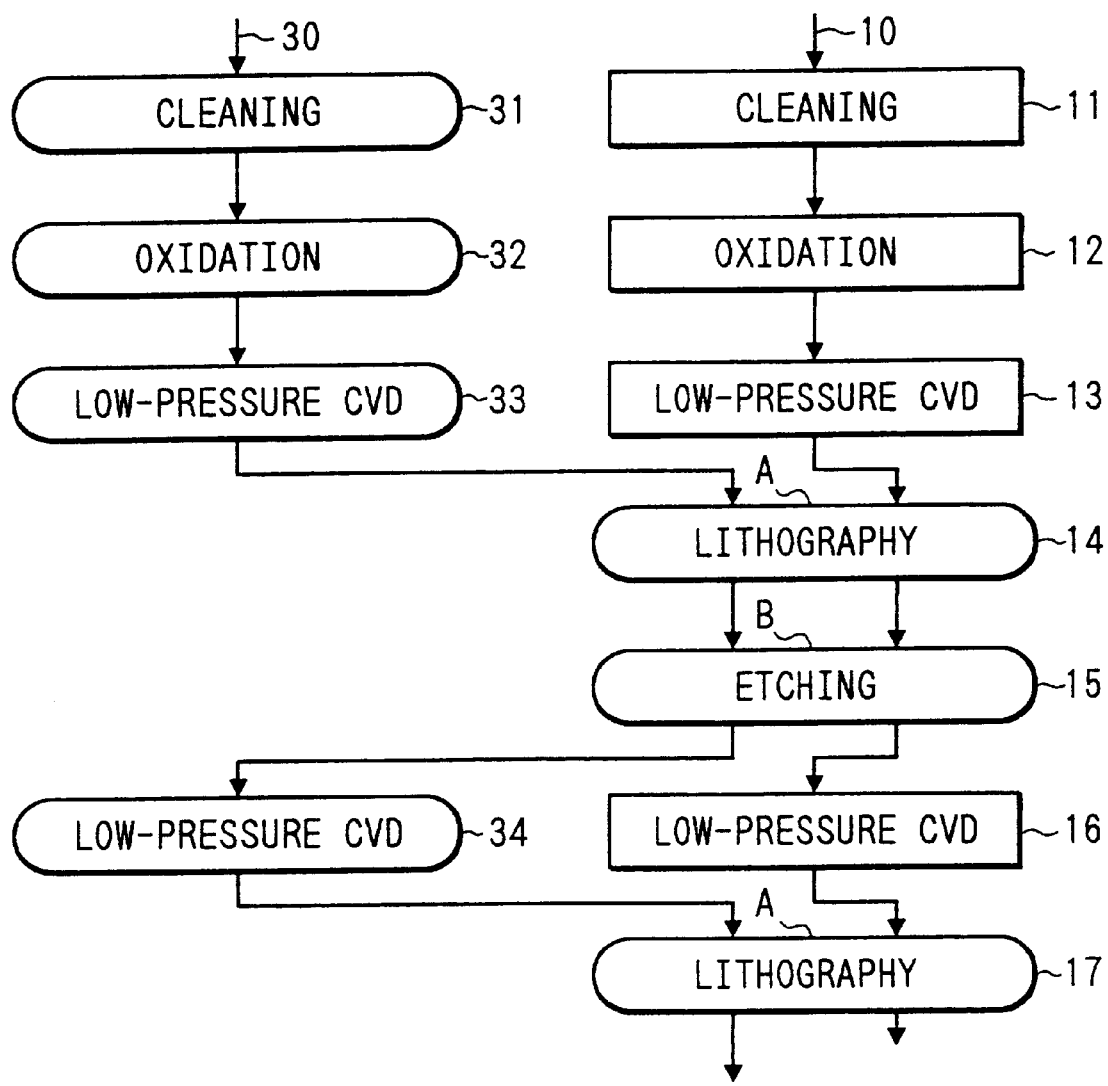
FIG. 1 is a process flow diagram showing a part of the process performed by a first embodiment of the processing system of this invention.

FIG. 1 is a process flow diagram showing basic processes performed by a processing system of this invention. The processes, as shown, comprise a main processing line 10 to process main objects and a sub-processing line 30 to process sub-objects. In a wafer manufacturing process (not shown) which precedes the processes shown, a cylindrical silicon ingot taken from a monocrystallizing process is, in a slicing process, sliced into wafers, which are then subjected to a lapping or polishing process to be formed into semiconductor wafers. These semiconductor wafers constitute the main objects and sub-objects to be processed.

The main processing line 10 has a cleaning process 11 to clean semiconductor wafers manufactured by the wafer fabrication process. This cleaning process 11 is a preprocessing for the next oxidation process 12, and selects an optimum cleaning liquid and cleans a number of wafers at a time, that is, in a batch.

The wafers that have passed the cleaning process 11 are fed to an oxidation process where they are batch-processed to form an oxidized film over the surfaces of the wafers. The oxidation equipment used in the oxidation process of this instance employs a wet $O_2$ oxidation. Other possible oxidizing equipment include those using a dry $O_2$ oxidation, steam oxidation, hydrogen combustion oxidation, high-pressure oxidation, oxygen pressure oxidation, halogen oxidation, plasma oxidation and anode oxidation.

After having been treated by the oxidation process 12, the wafers are carried to a low-pressure CVD process 13 using a vapor phase epitaxy where they are batch-processed to form an insulating film over the surfaces of the wafers. In the instance shown, a low-pressure CVD apparatus is used to form a silicon nitride film. The kind of reaction gas, type of reaction, reaction temperature and pressure are selected according to the property of the insulating film to be formed.

The semiconductor wafers that have undergone the low-pressure CVD process are carried to a photoetching process to form a device pattern. The photoetching process comprises a lithography process 14 to transfer a mask pattern onto the photoresist applied to the surface of the wafers, and an etching process 15 to etch an underlying film through the resist pattern and then remove the resist. Each of the processes 14, 15 treats the wafers on a sequential basis, a minimum number of wafers at a time.

A pattern exposure system that constitutes the lithography process 14 receives several tens of wafers and then transfers a circuit pattern onto a mask blank one wafer at a time by using a visible light, ultraviolet light or electron beam. Among the pattern exposure systems that may be used are a reduced exposure system, a contact proximity system, an electron beam pattern exposure system, and a laser pattern exposure system.

The etching apparatus that constitutes the etching process 15 may, for example, use a dry etching apparatus, such as a plasma etching apparatus, a reactive ion etching apparatus and a reactive sputter etching apparatus, and a wet etching apparatus such as a dip etching apparatus. After the etching process 15, the wafers are again transferred to the low-pressure CVD process 16 where an insulating film is deposited over the wafer surfaces before they are carried to the lithography process 17.

The wafer processing includes, as mentioned above, essential processes of oxidation, insulating film forming and photoetching. These processes are repeated a number of times until the wafer is complete. Although the main processing line 10 is shown comprised of the cleaning process 11 through the lithography process 17, it actually is made up of a greater number of processes including the essential ones.

The sub-processing line 30 that processes sub-objects comprises a cleaning process 31 to clean the wafers in much the same way as the cleaning process 11, an oxidation process 32 to oxidize the surfaces of the wafers as in the oxidation process 12, and a low-pressure CVD process 33 to form an insulating film over the surfaces of the wafers in much the same way as the low-pressure CVD process 13. The wafers, after finishing these processes 31–33, are transferred to the lithography process 14 that makes up the main processing line 10, after which they are further sent to the etching process 15 where they are subjected to photo-etching. The wafers, after having undergone the etching process 15, are fed into a low-pressure CVD process 34 that corresponds to the low-pressure CVD process 16.

As described above, the sub-processing line 30 comprises processes 31–34 that process only the sub-objects and processes 14, 15, 17 that make up the main processing line 10. The lithography processes 14, 17 and etching process 15 of the main processing line 10 also constitute a part of the sub-processing line 30.

In each of the processes 31–34 making up the sub-processing line 30, the minimum number of wafers processed on a sequential basis is normally one. But two or so wafers may be processed at a time on a sequential basis.

Where the main processing line 10 is used as a line to manufacture mass-produced production-type wafers, the sub-processing line 30 can be used as a line to manufacture a sample product of the wafer. That is, the main processing line 10 handles the wafers as the main objects to manufacture the production-type wafers, while the sub-processing line 30 handles the wafer as the sub-object to make a sample product of the wafer.

In this case, the cleaning process 11, the oxidation process 12 and the low-pressure CVD processes 13, 16, all making up the main processing line 10, are main batch processing sections that process a plurality of production-type wafers, the main objects, at one time. The lithography processes 14, 17 and the etching process 15 are main sequential processing sections that process one wafer at a time. The cleaning process 31, the oxidation process 32 and the low-pressure CVD processes 33, 34, all forming only the sub-processing line 30, are sub-processing sections, each of which treats the wafers sequentially. The main sequential processing sections shared by the main processing line 10 and the sub-processing line 30 handle both the main objects, the production-type wafers, and the sub-objects, the sample wafers.

When the sub-processing line 30 is used for the manufacture of sample wafers, the following steps are taken. That is, either an independent sub-processing line 30 may be built or a main processing line 10 and a sub-processing line 30 may be constructed side by side. Then, a wafer for a sample product, the sub-object, is placed on the sub-processing line 30 for sequential processing in each of the processes 31–34 making up the sub-processing line 30 and of the processes 14, 15, 17.

The completed sample wafer, which has passed the sub-processing line 30, is inspected to determine optimum conditions by changing the processing conditions such as the kind of process gas, temperature and pressure in each process. The conditions thus obtained are fed back to respective processes of the main processing line 10 that manufactures the production-type wafers. In this way, the production-type wafers can be fabricated efficiently under the optimum conditions.

If the main processing line 10 is used to make a sample wafer, a significant length of time is required. But using the sub-processing line 30 in this way substantially reduces the time taken to fabricate the sample wafer. That is, when the batch-type low-pressure CVD process 13 is used to process the wafer for sample product, even a single sample wafer will require such processing as will be used to treat 100 or so wafers because the batch-type low-pressure CVD apparatus is operated under the optimum conditions. This will take about four hours. However, performing the sequential processing in the low-pressure CVD process 33 takes only about 15 minutes to complete the sample wafer. Therefore, in determining optimum processing conditions for production-type wafers by repetitively processing sample wafers on a trial-and-error basis, the processing time can be greatly reduced by the sequential processing.

The sample wafer manufacture using the sub-processing line 30 may be performed while fabricating the production-type wafers of a kind different from the sample wafer on the main processing line 10. That is, the main processing line 10 and the sub-processing line 30 are run simultaneously, and while the production-type wafers are processed by the main processing line 10, a different type of wafer than that of the production-type wafers may be test-manufactured.

In that case, the cleaning process 11, the oxidation process 12 and the low-pressure CVD processes 13, 16 making up only the main processing line 10 are the processing sections dedicated for the main objects that process a plurality of production-type wafers at a time. The lithography processes 14, 17 and the etching process 15 are the sequential processing sections commonly used by the both lines. On the other hand, the cleaning process 31, the oxidation process 32 and the low-pressure CVD processes 33, 34 making up only sub-processing line 30 are the processing sections dedicated for treating only the sub-objects.

Therefore, when, after the sample making has been finished, the production-type wafers of general-purpose components like memory are being processed, it is possible to manufacture a sample wafer of another kind on the sub-processing line 30. In this case, both the main and sub-processing lines 10, 30 are operating simultaneously, and the common sequential processing sections shared by both the lines 10, 30 handle mixed flows of sample wafers and the production-type wafers of general-purpose components such as memory at the same time.

It is also possible to manufacture two kinds of production-type wafers, whose experimental manufactures are finished, by using the main processing line 10 and the sub-processing line 30. For instance, while the general-purpose component wafers such as memory are processed on the main processing line 10, it is possible to process custom or semi-custom wafers such as gate arrays on the sub-processing line 30. In this case, therefore, the sequential processing sections shared by the both lines 10, 30 handle mixed flows of the general component wafers like memory wafers and the custom wafers like gate array wafers.

When both the main processing line 10 and the sub-processing line 30 are operated simultaneously, a merge point A of these two lines makes a decision on which of the wafer coming out of the low-pressure CVD process 13 on the main processing line 10 and the wafer coming out of the low-pressure CVD process 33 on the sub-processing line 30 should be transferred to the lithography process 14. For this purpose, a storage section is provided at this merging point A to temporarily store wafers put out from one of the low-pressure CVD processes 13, 33. At a branch point B for the two lines 10, 30 it is specified, according to the kind of wafer, to which of the two low-pressure CVD processes 16, 34 the wafers coming out of the etching process 15 should be carried.

The orders of processes on the main processing line 10 and on the sub-processing line 30 may not necessarily be identical.

Figure 2:
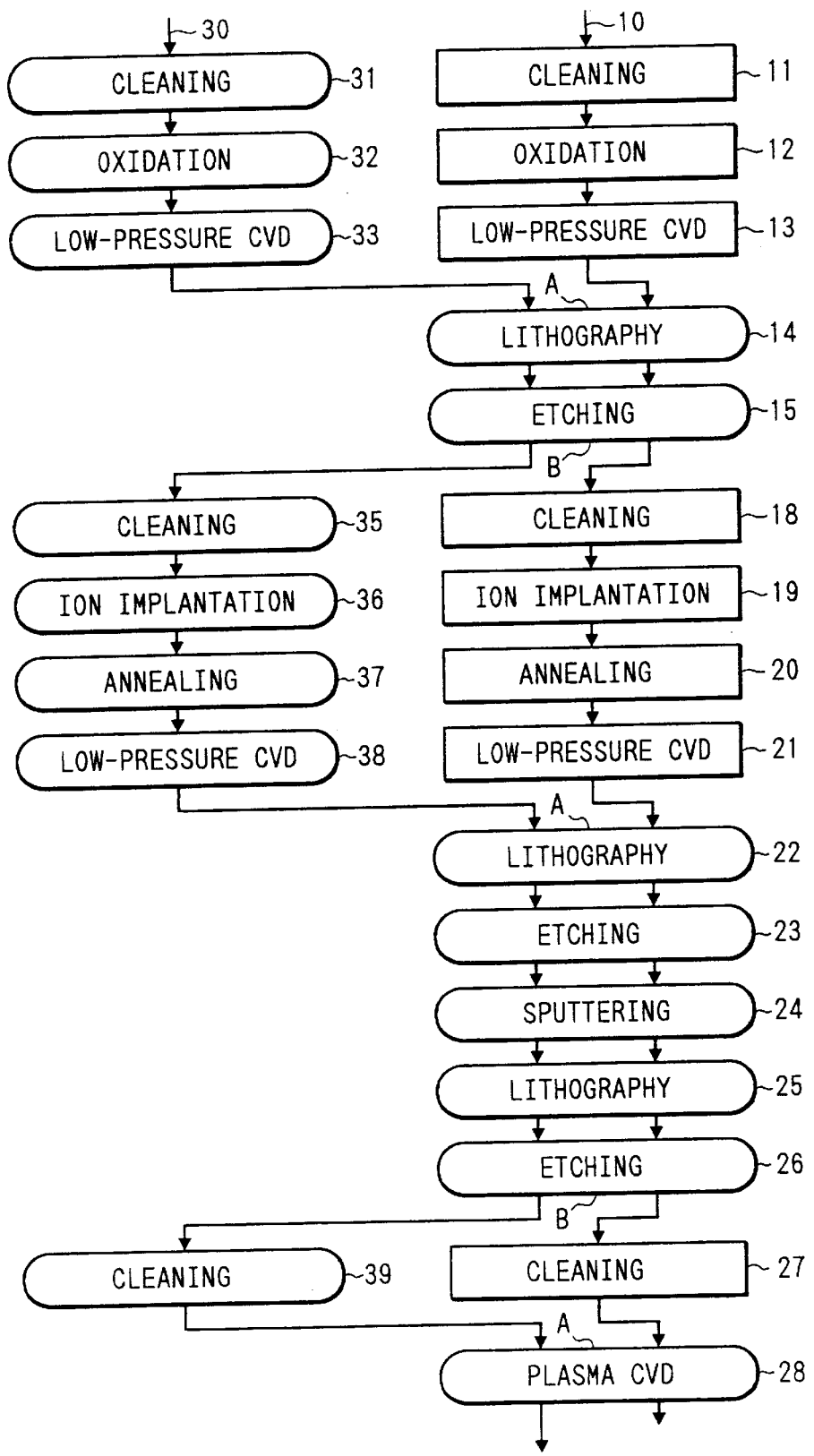
FIG. 2 is a process flow diagram showing a part of the process performed by a second embodiment of this invention.

FIG. 2 shows a process flow diagram of a second embodiment of this invention. The flow of the main processing line 10 of this embodiment is similar to the one shown in FIG. 1 up to the etching process 15. A step next to the etching process 15 is a cleaning process 18, in which a plurality of main objects are batch-processed. The methods used in the cleaning process 18 include chemical methods, such as acid cleaning, alkali cleaning, water cleaning and etching, and physical methods such as ultrasonic cleaning. Any appropriate cleaning method can be chosen according to the contamination of surface to be treated.

Next, the wafers are fed to an ion implantation process 19 to introduce impurities therein. The ion implantation process 19 is a batch processing whereby a plurality of wafers can be ion-implanted simultaneously.

Next to the ion implantation process 19 is an anneal process 20 where the ion-implanted wafers are heat-treated. The annealing apparatus used in this process can be chosen from a wide range of apparatuses, including a laser annealing apparatus, an electron beam annealing apparatus, a flash lamp annealing apparatus, heat radiation annealing apparatus, and an electric furnace annealing apparatus. Next to the anneal process 20 is a low-pressure CVD process 21, which, like the low-pressure CVD process 13, forms an insulating film on a batch basis. The next lithography process 22 and etching process 23 carry out the same operations as the previous processes 14, 15.

Next to the etching process 23 is a sputtering process 24 such as a PVD or physical vapor deposition. In this sputtering process 24, the wafers carried along the main processing line 10 and those running on the sub-processing line 30 are subjected to sputtering on a sequential basis. Hence, this process constitutes a main sequential processing section and also a common sequential processing section. The wafer is formed with wiring of conductive film made of aluminum or its alloy by the sputtering. Sputtering that can be used in this process includes a magnetron sputtering and a reactive sputtering.

Following the sputtering process 24 are again a lithography process 25 and an etching process 26, both performed on a sequential basis. Next, a cleaning process 27 is carried out on a batch basis. In a plasma CVD process 28 following the cleaning process 27, an insulating film is formed in much the same way as in the low-pressure CVD processes 13, 21. One difference is that the plasma VCD process 28 forms the film on a sequential basis by decomposing a reactive gas under reduced pressure by plasma discharge. The plasma CVD apparatus may be chosen from among high-frequency plasma, microwave plasma and ECR plasma apparatuses. This plasma CVD process 28, too, constitutes a main sequential processing section and a common sequential processing section.

The above processes 11–28, which form the main processing line 10 for processing the main objects, are repeated a number of times in a variety of orders to produce final wafer products.

On the other hand, the processes 31–33 making up the sub-processing line 30 perform the same processing as shown in FIG. 1. After having undergone the lithography process 14 and the etching process 15, both forming the photoetching process as well as the sub-processing line 30, the wafers are transferred to the cleaning process 35 where they are cleaned on a sequential basis.

Following the cleaning process 35 that corresponds to the batch-type cleaning process 18, the wafers as the sub-objects are fed to a sequential-type ion implantation process 36 which corresponds to the batch-type ion implantation process 19 and in which the wafers are ion-implanted on a sequential basis. Next, the wafers are carried to a sequential-type anneal process 37 that corresponds to the batch-type anneal process 20 and where they are annealed. The wafers are further carried to a sequential-type low-pressure CVD process 38 corresponding to the batch-type low-pressure CVD process 21 and where an insulating film is formed on a sequential basis.

After having finished the low-pressure CVD process 38, the wafers enter into a series of processes—including the lithography process 22 through the etching process 26—that form the main sequential processing sections and the common sequential processing sections, and then into a cleaning process 39 which corresponds to the cleaning process 27 and where they are cleaned.

In this way, the processes 31–39, lithography processes 14, 22, 25, etching processes 15, 23, 26 and plasma CVD process 28 combine to form the sub-processing line 30. These processes making up the sub-processing line 30 are repetitively performed a number of times to apply a complete set of processing to the wafers transported along the sub-processing line 30.

In a processing system having the processes shown in FIG. 2, it is also possible to build the main processing line 10 as a line to mass-produce production-type wafers and the sub-processing line 30 as a line to make an experimental product or sample product, as in the case of FIG. 1.

Further, while processing production-type wafers on the main processing line 10, it is possible to process sample or experimental wafers of a kind different from the production type on the sub-processing line 30. It is also possible to process general component wafers such as memory wafers on the main processing line 10 while processing custom or semi-custom component wafers such as logic or gate array wafers on the sub-processing line 30, thereby realizing simultaneous processing of mixed flows of different types of wafers.

Figure 3:
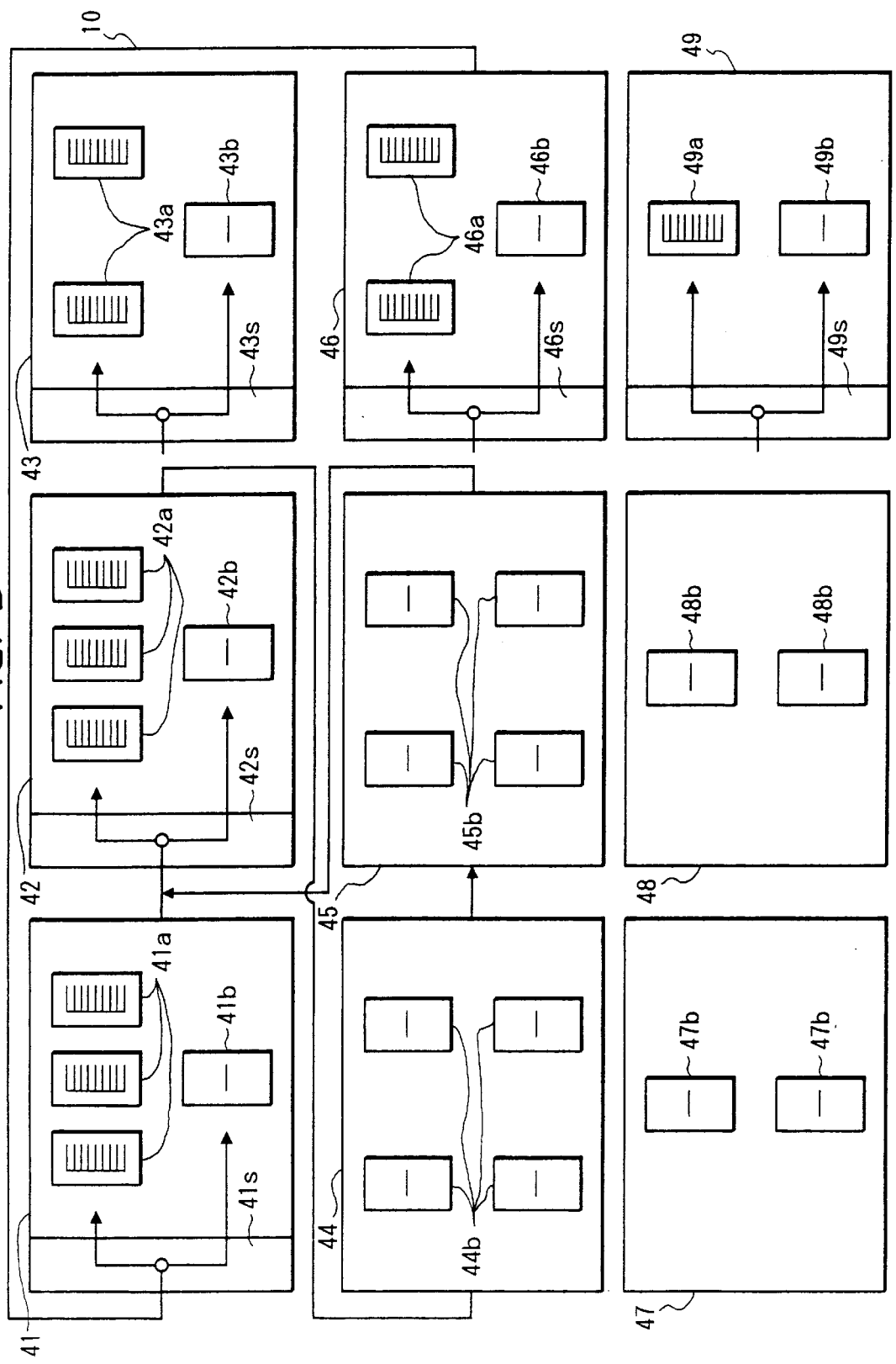
FIG. 3 is a plan view showing the layout of the first embodiment of the processing device.

FIG. 3 shows an example layout of a shop installed in a clean room to perform the wafer processing shown in FIG. 1 and 2.

Arranged in the clean room are an oxidation process region 41, a low-pressure CVD process region 42, an anneal process region 43, a lithography process region 44, an etching process region 45, a cleaning process region 46, a sputtering process region 47, a plasma CVD process region 48, and an ion implantation process region 49.

In the oxidation process region 41 are installed a plurality of batch-type oxidation processing apparatuses 41a and one sequential-type oxidation processing apparatus 41b. In the low-pressure CVD process region 42 are arranged a plurality of batch-type low-pressure CVD processing apparatuses 42a and one sequential-type low-pressure CVD processing apparatus 42b. In the anneal process region 43 are arranged a plurality of batch-type anneal processing apparatuses 43a and one sequential-type anneal processing apparatus 43b.

In the lithography process region 44 there are a plurality of lithography processing apparatuses 44b, all of sequential type. Likewise, the etching process region 45 is provided with a plurality of etching processing apparatuses 45b, all of sequential type. Further, the cleaning process region 46 is provided with a plurality of batch-type cleaning processing apparatuses 46a and one sequential-type cleaning processing apparatus 46b.

In the sputtering process region 47 a plurality of sputtering processing apparatuses 47b of sequential type are installed. Likewise, the plasma CVD process region 48 is provided with a plurality of sequential-type plasma CVD processing apparatuses 48b. The ion implantation process region 49 is provided with a batch-type ion implantation processing apparatus 49a and a sequential-type ion implantation processing apparatus 49b. Although this embodiment is shown to have a plurality of batch-type apparatuses and sequential-type apparatuses in each region, the number of apparatuses is determined considering the processing capacity and may be changed to one for each type.

Wafers are carried by a transport robot or a worker (not shown) into these regions 41–49, which form the main processing line 10 and the sub-processing line 30 shown in FIG. 1 and 2. When wafers are to be processed in the order of the main processing line 10 shown in FIG. 2, that is, when processing is to be performed on general component wafers, they are transported in the order shown in FIG. 2. In whichever regions 41–49 have a batch-processing apparatus, these wafers are supplied to that batch-processing apparatus without fail. FIG. 3 shows only the main processing line 10 of FIG. 1 for simplicity.

When wafers are processed in the order of the sub-processing line 30, that is, when processing is to be done to experimental wafers or custom wafers, the wafers are transported in the order shown to sequential processing apparatuses.

In the processes shown in FIG. 1 and 2, the main processing line 10 and the sub-processing line 30 have the same order in which to process the wafers. It is, however, possible to have the two lines take different transport paths to perform processing in different orders. This method of processing is suitably applied when the main processing line 10 and the sub-processing line 30 are both operated simultaneously to process mixed flows of different types of wafers.

In regions provided both with the batch processing apparatus forming the main processing line 10 and with the sequential processing apparatus forming the sub-processing line 30, such as the oxidation process region 41, there are installed branch stages 41s–43s, 46s, 49s at the inlet of these regions to direct individual wafers to their destination apparatuses. Which apparatus shall process the wafers supplied to each process region is specified by a command from a host computer not shown.

FIG. 4 shows another example of a shop laid out in the clean room, with components identical with those of FIG. 3 assigned like reference numerals.

As shown, arranged in an inner area of the room are a lithography process region 44, an etching process region 45, a sputtering process region 47 and a plasma CVD process region 48, each consisting of only sequential processing apparatuses. Surrounding these regions are an oxidation process region 41, a low-pressure CVD process region 42, an anneal process region 43, a cleaning process region 46, and an ion implantation process region 49. These surrounding regions are all provided with batch processing apparatuses and are each accompanied by a sequential processing apparatus 41b–43b, 46b, 49b installed in an adjacent region.

The present invention has been described in detail in conjunction with the example embodiments. It is noted that the invention is not limited to the above embodiments and that various modification may be made without departing from the spirit of the invention.

For example, the order of processing the objects may be other than that shown and be set arbitrarily. The processing order may be differentiated between the main object and the sub-object.

The above description centers on a case where the invention is applied to a semiconductor wafer processing or preprocessing of a wafer, one of the fields of application. The invention is not at all limited to this application but can also be applied to any processing techniques where the same processing of objects can be divided into a batch processing and a sequential processing.

Representative advantages of this invention may be briefly summarized as follows.

(1) Because an experimental product or sample object can be manufactured by using a plurality of sequential processing sections that make up the main processing line designed to process production-type objects, the experimental product manufacture can be performed all by sequential processing, making it possible to complete the experimental product in a short period of time.

(2) Data of the result of the experimental manufacture can be quickly fed back to the main processing line, allowing the main processing line to be started in a shorter period of time.

(3) While the production-type objects are processed on the main processing line, a sample product of a kind different from the production-type object can be processed on the sub-processing line. In other words, it is possible to simultaneously process the production-type objects and the experimental objects of a different kind than the production-type objects, resulting in a substantial improvement in the processing efficiency.

(4) It is possible to simultaneously process two different kinds of production-type objects on the main processing line and the sub-processing line, fully utilizing the same processing apparatus. That is, a plurality of products can be processed simultaneously and efficiently.

What is claimed is:

1. A method of fabricating two different types of semiconductor integrated circuit devices in a production line comprising the steps of:

(a) passing a first group of wafers through a first processing line,
said first processing line having a first set of batch processing sections and a second set of sequential processing sections; and (b) passing a second group of wafers through a second processing line,
said second processing line including a third set of sequential processing sections corresponding to said first set of batch processing sections, and further including said second set of sequential processing sections so that said second set of sequential processing sections form a part of both said first processing line and said second processing line.

2. A method of fabricating two different types of semiconductor integrated circuit devices according to claim 1 wherein said first set of batch processing sections includes a first film deposition processing section, which forms a film by CVD over the surface of the first group of wafers;

and said third set of sequential processing sections includes a second film deposition processing section corresponding to said first film deposition section, which forms a film over the surface of the second group of wafers.

3. A method of fabricating two different types of semiconductor integrated circuit devices according to claim 1 wherein said first group of wafers is larger in number than said second group of wafers.

4. A method of fabricating two different types of semiconductor integrated circuit devices according to claim 1 wherein said first group of wafers are semiconductor wafers to make integrated circuit memory devices, and said second group of wafers are semiconductor wafers to make custom integrated circuit devices or gate array devices.

* * * * *